United States Patent [19]

Hane et al.

[11] Patent Number: 4,626,553
[45] Date of Patent: * Dec. 2, 1986

[54] CATION EXCHANGE MEMBRANE OF A FLUOROCARBON POLYMER AND A PROCESS FOR PREPARING THE SAME

[75] Inventors: Toshioki Hane, Kawasaki; Jukichi Ohmura, Yokohama, both of Japan

[73] Assignee: Asahi Kasei Kogyo Kabushiki Kaisha, Osaka, Japan

[*] Notice: The portion of the term of this patent subsequent to Jul. 13, 1999 has been disclaimed.

[21] Appl. No.: 726,964

[22] Filed: Apr. 29, 1985

Related U.S. Application Data

[63] Continuation of Ser. No. 322,635, Nov. 18, 1981, abandoned.

[30] Foreign Application Priority Data

Nov. 29, 1980 [JP] Japan .................. 55-168554

[51] Int. Cl.⁴ ............................................. C08J 5/22
[52] U.S. Cl. ........................................ 521/27; 521/31; 156/309.3
[58] Field of Search ............... 521/27, 31; 156/309.3

[56] References Cited

U.S. PATENT DOCUMENTS

| | | | |
|---|---|---|---|
| 4,147,599 | 4/1979 | O'Leary | 204/87 |
| 4,151,053 | 4/1979 | Seko et al. | 521/29 |
| 4,176,215 | 11/1979 | Molnar et al. | |
| 4,178,218 | 12/1979 | Seko | |
| 4,200,711 | 4/1980 | Onoue et al. | |
| 4,255,240 | 3/1981 | Molnar et al. | 204/296 |
| 4,329,434 | 5/1982 | Kimoto et al. | 521/27 |
| 4,329,435 | 5/1982 | Kimoto et al. | 521/38 |
| 4,339,549 | 7/1982 | Tsushima et al. | 521/28 |
| 4,382,123 | 5/1983 | Kimoto et al. | 521/27 |
| 4,415,679 | 11/1983 | Grot | 521/28 |

FOREIGN PATENT DOCUMENTS

| | | | |
|---|---|---|---|
| 2254666 | 5/1973 | Fed. Rep. of Germany | 156/309.3 |
| 23192 | 2/1977 | Japan | |
| 36589 | 3/1977 | Japan | |
| 28588 | 3/1977 | Japan | |
| 132094 | 11/1978 | Japan | |
| 132089 | 11/1978 | Japan | |

*Primary Examiner*—Joseph L. Schofer
*Assistant Examiner*—Peter F. Kulkosky
*Attorney, Agent, or Firm*—Birch, Stewart, Kolasch & Birch

[57] ABSTRACT

A cation exchange membrane of a fluorocarbon polymer containing pendant carboxylic acid and/or carboxylate groups, preferably having, at a predetermined ratio, pendant carboxylic acid and/or carboxylate groups and pendant sulfonic acid and/or sulfonate groups uniformly distributed therein, is produced by contacting with a reducing agent a fluorocarbon polymer containing pendant groups of the formula:

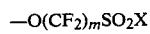

$$-O(CF_2)_m SO_2 X$$

wherein X is a fluorine atom, a chlorine atom, a hydrogen atom, M or OM in which M represents a hydrogen atom, a metal atom or an ammonium group, and m is as defined above, and transforming the resultant to a film. An excellent double-layer type composite cation exchange membrane can be produced by laminating the above-mentioned membrane having pendant carboxylic acid and/or carboxylate groups and pendant sulfonic acid and/or sulfonate groups on a membrane of a fluorocarbon polymer containing pendant sulfonic acid and/or sulfonate groups. In such a type of double-layer cation exchange membrane, both the two membranes are based on the same kind of polymer and, hence, peeling-off at the interface of the two layers can be well prevented while exhibiting high current efficiency and low electrolytic voltage.

6 Claims, No Drawings

CATION EXCHANGE MEMBRANE OF A FLUOROCARBON POLYMER AND A PROCESS FOR PREPARING THE SAME

This application is a continuation of application Ser. No. 322,635, filed on Nov. 18, 1981, now abanonded.

This invention relates to a cation exchange membrane of a fluorocarbon polymer containing pendant carboxylic acid and/or carboxylate groups together with pendant sulfonic acid and/or sulfonate groups and a process for preparing the same. More particularly, this invention is concerned with a cation exchange membrane of a fluorocarbon polymer comprising a layer obtained by contacting a fluorocarbon polymer having pendant sulfonic acid and/or sulfonate groups with a reducing agent to convert part of said pendant sulfonic acid and/or sulfonate group to pendant carboxylic acid and/or carboxylate groups, and transforming the resultant fluorocarbon polymer into a film so that the resulting film contains carboxylic acid and/or carboxylate groups together with sulfonic acid and/or sulfonate groups uniformly distributed in the film thus enabling the film to be so improved as not to bring about partial cleavage or peeling-off, dot-like swelling and/or blistering of the film in the course of the electrolysis when the film is used as a cation exchange membrane for the electrolysis of, for example, an aqueous solution of an alkali metal halide under severe conditions, and a process for preparing the same.

In recent years, intensive research has been conducted to develop fluorocarbon polymer-based cation exchange membranes or resins that exhibit improved cation exchange capacity and have excellent resistance to chemicals and thermal resistance and also to develop novel chemical processes utilizing cation exchange membranes or resins.

In the field of production of caustic soda and chlorine by the electrolysis of salt, increasing attention has been given to a cation exchange membrane process which can produce caustic soda comparable in quality to that obtained by the conventional mercury process, and which is more advantageous than the conventional mercury and diaphragm processes from the viewpoints of pollution prevention and energy saving.

Economy of the cation exchange membrane process is, to a greater extent, governed by the properties of the cation exchange membrane used. In general, preferred cation exchange membranes should meet the following requirements.

(1) It should exhibit a high current efficiency and low electrical resistance:

In order to increase the current efficiency, it is required that the ion exchange capacity of the membrane be sufficiently large whereas the water content of the membrane be sufficiently low, thereby causing the density of fixed ions in the membrane to be high. On the other hand, to lower the electrical resistance, it is rather advantageous to increase the water content of the membrane, which is contrary to the above requirements. The water content varies according to the type of ion exchange groups, the ion exchange capacity and the concentration of ions in the surrounding liquid. Consequently, choice of the optimum combination of the above factors is of importance.

(2) It should exhibit a high resistance to chemicals, and be able to be used in the environment of chlorine or alkali at high temperatures over a long period of time:

Cation exchange membranes made of fluorocarbon polymers are generally expected to possess sufficient resistance to chemicals and, therefore, can be used for a long time under such severe conditions. However, there are fluorocarbon polymer-based cation exchange membranes not having sufficient resistance to chemicals, depending upon the kind of ion exchange groups incorporated in the membrane. Therefore, it is of importance to choose appropriate ion exchange groups to be incorporated into the cation exchange membrane.

(3) It should exhibit a sufficient physical strength in a high-concentration alkali solution at a high temperature:

The physical strength of the membrane is usually dependent on the physical structure of the membrane, the composition of polymer, the ion exchange capacity and the type of ion exchange groups. Therefore, it is of importance to choose the optimum combination of such factors so that the membrane can enjoy sufficient mechanical strength under severe conditions.

(4) It should be easily produced at low cost:

Heretofore, various kinds of fluorocarbon polymer-based cation exchange membranes have been proposed for use in the electrolysis of an aqueous alkali metal halide solution. For example, there is known a fluorocarbon polymer-based cation exchange membrane containing pendant sulfonic acid groups which is obtained by saponifying a copolymer of tetrafluoroethylene and perfluoro-3,6-dioxa-4-methyl-7-octene-sulfonyl fluoride. This known perfluorocarbon cation exchange membrane containing only sulfonic acid groups, however, has such a disadvantage that the membrane has a high water content and, therefore, has a low density of fixed ions in the membrane so that current efficiency is low. The disadvantage of such a low current-efficiency may be alleviated by lowering the ion exchange capacity of the membrane so that the density of fixed ions in the membrane is increased. Such lowering of the ion exchange capacity, however, is not successful in improving the current efficiency to 90% or more, rather resulting in a serious increase in electrical resistance of the membrane and a proportional increase in power consumption. This resolution, therefore, is not without economic difficulties.

With a view to improving the current efficiency, it has been suggested to use various kinds of fluorocarbon polymer-based cation exchange membranes containing carboxylic acid groups which membranes exhibit a low water content within the membrane and thus the high density of fixed ions within the membrane as compared with those containing the sulfonic acid group when the ion exchange capacities of them are the same. When electrolysis is carried out by the use of such a cation exchange membrane comprising a fluorocarbon polymer containing carboxylic acid groups only, a high current efficiency of 90% or more may be attainable. In that instance, however, the electrical resistance of the membrane and thus the electrolytic voltage considerably increases. As stated above, a cation exchange membrane of a fluorocarbon polymer containing carboxylic acid groups only has a drawback that it is inevitably accompanied by an increased cost of power.

To provide a cation exchange membrane capable of exhibiting the effect of the combination of the advantage characteristic of the sulfonic acid group featuring an increased water content but a decreased electrical resistance and that characteristic of the carboxylic acid group featuring a decreased water content and an increased current efficiency as mentioned above, it has been suggested to use a double-layer type composite cation exchange membrane in which a first film is made of a fluorocarbon polymer containing only carboxylic acid groups and/or groups convertible thereto and a second film is made of a fluorocarbon polymer containing only sulfonic acid groups and/or groups convertible thereto. With respect to the two-layer type composite cation exchange membrane, peeling-off of layers at the interface is liable to occur during the electrolysis due largely to a marked difference in physical properties between the constituent polymers having different chemical structures and to a sharp change in water content between the two layers resulting from their differed hydrophilicity.

For the above-mentioned purpose of combining the advantages, it has also been suggested, besides the above-mentioned double-layer type composite membrane, to use a cation exchange membrane obtainable by blending, at a predetermined ratio, a fluorocarbon polymer containing carboxylic acid groups, carboxylate groups and/or groups convertible to either thereof and a fluorocarbon polymer containing sulfonic acid groups, sulfonate groups and/or groups convertible to either thereof and subjecting the blend to molding to form a membrane. However, these polymers with different functional groups have poor compatibility with each other, so that practically complicated procedures are needed to achieve a satisfactory blending of different polymers on a molecular level. Therefore, the membrane made of blended polymers has a drawback that the carboxylic acid type groups and sulfonic acid type groups are unevenly distributed within the membrane, thus causing the electrical resistance to vary within the membrane at its portion to portion. The expression "unevenly distributed" as used herein means that the ratio of carboxylic acid groups, carboxylate groups and/or groups convertible to either thereof present in the membrane to sulfonic acid groups, sulfonate groups and/or groups convertible to either thereof present in the membrane is not constant at different portions of the membrane.

In addition, with respect to the above-mentioned membranes in which the carboxylic acid type groups and the sulfonic acid type groups are employed in combination, two different types of polymers are necessarily used and therefore there are needed two different kinds of fluorocarbon vinyl monomers with different functional groups, viz. a fluorocarbon vinyl monomer containing carboxylic acid groups, carboxylate groups and/or groups convertible to either thereof and a fluorocarbon vinyl monomer containing sulfonic acid groups, sulfonate groups and/or groups convertible to either thereof. This has a disadvantage that there is necessarily increased the number of steps in the process, leading to a serious increase in cost.

Furthermore, there has also been proposed the use of a fluorocarbon-based cation exchange membrane which is obtained by subjecting to chemical treatment one surface layer portion of a membrane of a fluorocarbon polymer containing pendant sulfonic acid and/or sulfonate groups of the formula:

$$-OCF_2CF_2SO_3M'$$

wherein M' stands for a hydrogen atom, a metal atom or an ammonium group, to form carboxylic acid and/or carboxylate groups in said surface layer portion. Such a cation exchange membrane may exhibit a high current efficiency and low electrical resistance. However, this kind of cation exchange membrane is still unsatisfactory because unfavorable phenomena such as dot-like swelling and/or blistering of the surface layer portion, peeling-off of the carboxylic layer from the sulfonic layer, and/or cracking of the carboxylic layer which lead to a decrease in current efficiency tend to occur during the electrolysis under severe conditions, for example, at a high current density and at a high temperature. The reason for such unfavorable phenomena have not yet been elucidated, but it is assumed to be partly attributable to the chemical structure of the starting fluorocarbon-based cation exchange membrane containing sulfonic acid groups and/or groups derived therefrom. Furthermore, production of said cation exchange membrane is accompanied by the problem of an apparatus for practicing, on a commercial scale, the process of subjecting one surface layer portion of a membrane to chemical treatment.

The present inventors have made intensive research with a view to developing a cation exchange membrane which has carboxylic acid and/or carboxylate groups together with sulfonic acid and/or sulfonate groups both uniformly distributed therein and, hence, does not undergo unfavorable partial cleavage or peeling-off, dot-like swelling and/or blistering of the surface layer portion of the membrane, thereby exhibiting high current efficiency and low electrolytic voltage stably during the electrolysis for the prolonged period of time, and which can be produced at low cost. As a result, there has been developed a cation exchange membrane of a fluorocarbon polymer which comprises a layer containing pendant carboxylic acid and/or carboxylate groups of the formula:

$$-O(CF_2)_{m-1}COOM'$$

wherein M' represents a hydrogen atom, a metal atom or an ammonium group, and m is an integer of 3 to 5, which is obtained by contacting with a reducing agent a fluorocarbon polymer containing pendant groups of the formula:

$$-O(CF_2)_mSO_2X$$

wherein X is a fluorine atom, a chlorine atom, a hydrogen atom, M or OM in which M represents a hydrogen atom, a metal atom or an ammonium group, and m is as defined above; and transforming the resultant fluorocarbon polymer into a film. In addition, according to another aspect of the present invention, it is possible to form a double-layer type composite membrane by laminating a film of a fluorocarbon polymer containing carboxylic acid and/or carboxylate groups together with sulfonic acid and/or sulfonate groups on a film of a fluorocarbon polymer containing sulfonic acid and/or sulfonate groups. In this double-layer type composite membrane both the fluorocarbon polymers are based on the same starting polymer and hence the laminated fluoropolymers have substantially the same molecular weight and other resemblances to each other so that peeling-off at the interface of the two layers may be prevented to a significant degree.

It is therefore an object of the present invention to provide a cation exchange membrane which does not undergo, under severe conditions, partial cleavage or peeling-off, dot-like swelling and/or blistering of the surface layer portion of the membrane, thereby exhibiting high current efficiency and low electrolytic voltage during the electrolysis for a prolonged period of time and which can be produced at reduced costs.

Another object of the present invention is to provide a process for preparing a cation exchange membrane of the kind described above.

The foregoing and other objects, features and advantages of the present invention will be apparent to those skilled in the art from the following detailed description and appended claims.

In accordance with one aspect of the present invention, there is provided a cation exchange membrane of a fluorocarbon polymer which comprises a layer containing pendant carboxylic acid and/or carboxylate groups of the formula:

$$-O(CF_2)_{m-1}COOM'$$

wherein M' represents a hydrogen atom, a metal atom or an ammonium group, and m is an integer of 3 to 5, obtained by contacting with a reducing agent a fluorocarbon polymer containing pendant groups of the formula:

$$-O(CF_2)_mSO_2X$$

wherein X is a fluorine atom, a chlorine atom, a hydrogen atom, M or OM in which M represents a hydrogen atom, a metal atom or an ammonium group, and m is as defined above, and transforming the resultant fluorocarbon polymer into a film. In the above formula, M and M' each independently are preferably an alkali metal atom. The resulting film has carboxylic acid and/or carboxylate groups and sulfonic acid and/or sulfonate groups uniformly distributed therein.

In accordance with another aspect of the present invention, there is provided a process for preparing a cation exchange membrane of a fluorocarbon polymer which membrane comprises a layer containing pendant groups of the formula:

$$-O(CF_2)_{m-1}COOM'$$

in which M' represents a hydrogen atom, a metal atom or an ammonium group, and m is an integer of 3 to 5, characterized in that a fluorocarbon polymer containing pendant groups of the formula:

$$-O(CF_2)_mSO_2X$$

wherein X is a fluorine atom, a chlorine atom, a hydrogen atom, M or OM in which M represents a hydrogen atom, a metal atom or an ammonium group, and m is as defined above, is contacted with a reducing agent and the resultant fluorocarbon polymer is tranformed to a film.

The characteristic feature of the cation exchange membrane of a fluorocarbon polymer according to the present invention resides in that the pendant carboxylic acid and/or carboxylate groups and pendant sulfonic acid and/or sulfonate groups are uniformly distributed in the membrane as opposed to the abovementioned conventional blended polymer membrane because the single, base polymer of the present membrane is treated with a reducing agent prior to being subjected to transforming to a film. The expression "uniformly distributed" as used herein means that the ratio of carboxylic acid and/or carboxylate groups present in the membrane to sulfonic acid and/or sulfonate groups present in the membrane is constant at any portion of the membrane. The ratio of carboxylic acid and/or carboxylate groups present in the fluorocarbon polymer to sulfonic acid and/or sulfonate groups present in the fluorocarbon polymer may be variable at will by varying the degree of reduction. According to the present invention, therefore, it is possible to form a double-layer type composite cation exchange membrane by laminating a film of a fluorocarbon polymer containing a varied ratio of pendant carboxylic acid and/or carboxylate groups to pendant sulfonic acid and/or sulfonate groups on a film of a fluorocarbon polymer containing pendant sulfonic acid and/or sulfonate groups only. Due to the improved inter-layer adhesion caused by not only the resemblance in physical property between the two layers but also the presence of sulfonic acid and/or sulfonate groups of the same chemical structure in both the layers, the above-mentioned double-layer type composite cation exchange membrane does not undergo unfavorable partial cleavage or peeling-off, dot-like swelling and/or blistering of the membrane and exhibits high current efficiency and low electrolytic voltage for a prolonged period of time during the electrolysis, as compared with the aforementioned conventional double-layer membrane comprising a film of a polymer containing pendant carboxylic acid groups only and a film of a polymer containing pendant sulfonic acid groups only. Furthermore, such an improved cation exchange membrane can be produced with extremely high efficiency at low cost as compared with the conventional blended polymer membrane because only a single kind of fluorocarbon vinyl monomer having substituents capable of functioning as ion exchange groups or groups convertible thereto, which is usually very expensive, is sufficient as the starting compound.

Now, this invention will be explained in detail. The cation exchange membrane of the present invention comprises a layer of a fluorocarbon polymer containing pendant carboxylic acid and/or carboxylate groups of the formula:

$$-O(CH_2)_{m-1}COOM'$$

wherein m and M' are as defined above. In a more preferred embodiment of the present invention, the cation exchange membrane comprises, in addition to said layer, a second layer laminated on said layer, said second layer of a fluorocarbon polymer containing pendant groups of the formula $-O(CF_2)_mSO_3M'$ in which m and M' are as defined above.

The layer of a fluorocarbon polymer containing the groups of the above formula $-O(CF_2)_{m-1}COOM'$ may have an equivalent weight of 800 to 2,000, more preferably 850 to 1,650, and the layer may vary depending on the equivalent weight but usually contain 20 to below 100 mol %, preferably 40 to below 100 mol based on the total cation exchange groups, of carboxylic acid and/or carboxylate groups. The term "equivalent weight" as used herein means the number of grams of polymer containing one equivalent of ion exchange functional group. A cation exchange membrane comprising a fluorocarbon polymer with an equivalent weight of less than 800 will cause grave swelling of the membrane when immersed in the electrolytic cell, which leads to decrease of the mechanical strength. On the other hand, a cation exchange membrane comprising a fluorocarbon polymer with an equivalent weight of more than 2,000 has so high an electrical resistance that the membrane may not be used for practical purposes.

If the pendant carboxylic acid and/or carboxylate groups are present in the membrane in an amount of less than 20 mol % based on all the cation exchange groups, the membrane usually will not attain a high current efficiency. If the mol percent of the pendant carboxylic acid and/or carboxylate groups is 100% based on all the cation exchange groups, however, the membrane is liable to undergo a peeling-off at the interface when it is used in the form of a double-layer membrane with a film of a fluorocarbon polymer containing sulfonic acid groups only. As described above, it is requisite that, in the layer containing carboxylic acid and/or carboxylate groups of the formula $-O(CF_2)_{m-1}COOM'$, there remain sulfonic acid and/or sulfonate groups. The minimum content of sulfonic acid and/or sulfonate groups in the layer may be in such an amount as can be detected by means of customary analytical methods such as sulfur analysis, surface infra-red absorption spectroscopy and staining.

The layer of the cation exchange membrane according to the present invention may have a thickness of 5 to $100\mu$, more preferably 7 to $50\mu$. The thickness of the membrane has a great influence on the electrolytic voltage and hence, it is desirable to make the film as thin as possible within such a range as will not adversely affect the current efficiency.

To reinforce the layer containing carboxylic acid and/or carboxylate groups made as thin as possible as mentioned above, a double-layer type composite structure is preferred which comprises, in addition to said layer, a second layer of a fluorocarbon polymer containing sulfonic acid and/or sulfonate groups of the formula:

$$-O(CF_2)_mSO_3M'$$

wherein m and M' are as defined above.

The first-mentioned layer containing pendant carboxylic acid and/or carboxylate groups and pendant sulfonic acid and/or sulfonate groups has an equivalent weight at least 150 higher than the second layer containing sulfonic acid and/or sulfonate groups only. The equivalent weight of the second layer may be in the range of 800 to 1,500, more preferably 850 to 1,300, and the value of eqivalent weight to be employed is appropriately determined, taking into consideration the electrolytic voltage. The minimum thickness of the second layer may usually be $50\mu$ or more, and its maximum thickness is determined taking into account the retention of the mechanical strength of the whole cation exchange membrane structure and the elevation of the electrolytic voltage. The maximum thickness usually does not exceed $250\mu$. In the case of a double-layer type composite membrane or laminated membrane, it is preferred from the viewpoint of decreasing the electrical resistance that the thickness of the first mentioned layer containing pendant carboxylic acid type groups and sulfonic acid type groups be in the range of from 1/20 to ½ of the total thickness of the composite membrane.

The cation exchange membrane of a fluorocarbon polymer according to the present invention can be prepared through the following four steps:
(1) Production of a copolymer;
(2) Converting, as desired, pendant groups of the copolymer to $-O(CF_2)_mSO_2X$;
(3) Contacting the resulting polymer with a reducing agent; and
(4) Transforming the resultant polymer into a film.

Each of the above steps is as described below.

Concerning the first step, the starting fluorocarbon polymer is produced by copolymerizing a monomer selected from olefins represented by the following formula:

$$CA_1A_2=CA_3A_4$$

wherein $A_1$ and $A_2$ each independently stand for F or H, $A_3$ stands for F, Cl or H, and $A_4$ stands for F, Cl, $CF_3$, H, $CH_3$ or $OR_F$, in which $R_F$ stands for a $C_1-C_5$ perfluoroalkyl group, or more preferably, a monomer selected from fluorinated olefins represented by the following formula:

$$CF_2=CFL$$

wherein L stands for F, Cl, $CF_3$, H, or $OR_F$ in which $R_F$ stands for a $C_1-C_5$ perfluoroalkyl group, and a monomer selected from sulfur-containing fluorinated vinylethers represented by the following formula:

$$CF_2=CFO(CF_2CFO)_{\theta}(CF_2)_{\overline{m}}-Y$$
$$\phantom{CF_2=CFO(CF_2}|$$
$$\phantom{CF_2=CFO(CF_2}CF_3$$

wherein $\theta$ stands for 0 or 1, m has the same meaning as defined above, and Y stands for $-SR_3$ or $-SO_2R_4$ in which $R_3$ represents a $C_1-C_{10}$ alkyl group, a $C_6-C_{14}$ aryl group, a chlorine atom or a $C_1-C_{10}$ perfluoroalkyl group, $R_4$ represents $R_3$, F or OM, said M having the same meaning as defined above.

As the fluorinated olefin used according to the present invention, an olefin containing no hydrogen atoms is preferable and tetrafluoroethylene is most preferred from the viewpoints of thermal and chemical resistances.

Specific examples of the sulfur-containing fluorinated vinylethers that are preferably used in the present invention include:

$$CF_2=CFOCF_2CF_2CF_2SO_2F \text{ and}$$

$$\phantom{CF_2=CFOCF_2}CF_3$$
$$\phantom{CF_2=CFOCF_2}|$$
$$CF_2=CFOCF_2CFOCF_2CF_2CF_2SO_2F.$$

These sulfur-containing fluorinated vinylethers are more advantageous than those conventionally used to prepare a cation exchange membrane or cationic resin comprising fluorinated polymers containing pendant sulfonic acid and/or carboxylic acid groups which are represented by the following formula:

$$\phantom{CF_2=CFO(}CF_3$$
$$\phantom{CF_2=CFO(}|$$
$$CF_2=CFO(CF_2CFO)_nCF_2CF_2SO_2F$$

in which n is an integer of 0 to 2, in view of the stability of the carboxylic acid groups to be introduced by chemical treatment of the resulting polymer.

The content ratio of the olefin to the sulfur-containing fluorinated vinylether in the copolymer may be adjusted by varying the charge ratio of monomers and polymerization reaction conditions.

The copolymer according to the present invention is produced according to procedures well known in the art for the homopolymerization or copolymerization of a fluorinated ethylene.

Polymerization may be effected in either aqueous or nonaqueous systems. Generally, the polymerization is performed at temperatures of from 0° to 200° C., more preferably from 20° to 100° C., under a pressure of from 0 to 200 kg/cm²-gauge, more preferably from 1 to 50 kg/cm²-gauge. Frequently, the polymerization in the nonaqueous system is carried out in a fluorinated solvent. Examples of such nonaqueous solvents include 1,1,2-trichloro-1,2,2-trifluoroethane and perfluorocarbons such as perfluoromethylcyclohexane, perfluorodimethylcyclobutane, perfluorooctane and perfluorobenzene.

The aqueous system polymerization may be accomplished, for example, by a customary emulsion polymerization method in which the monomers are contacted with an aqueous solvent containing a free radical initiator and an emulsifier to produce a slurry of polymer particles, or by a customary suspension polymerization method in which the monomers are contacted with an aqueous solvent containing a free radical initiator and a dispersant inert to the telomerization to produce a dispersion of polymer particles, followed by precipitation of the polymer particles. As the free radical initiator used for the purpose of the above-mentioned aqueous and non-aqueous system polymerization, there can be mentioned, for example, an oxidation-reduction catalyst such as ammonium persulfate-sodium hydrogensulfite, an organoperoxide compound such as t-butylperoxide and benzoylperoxide, an azobis compound such as azobis isobutyronitrile, and a fluorine-radical generating agent such as $N_2F_2$.

After the polymerization reaction, if desired, the resulting polymer, in the form of a polymer solution or slurry as it is, or an isolated solid or a granulated product, is subjected to chemical treatment in the second step to obtain a fluorocarbon polymer containing pendant groups of the formula:

$$-O(CF_2)_mSO_2X$$

in which X and m are as defined above.

In case the terminal group Y of the above-mentioned sulfur-containing fluorinated vinylether monomer to be used as a starting compound is a sulfido group of the formula:

$$-SR_3$$

in which $R_3$ is as defined above. The sulfido group may be converted to a sulfonyl halide group by reacting the polymer with a halogen. Of the halogens used for the above purpose, chlorine is preferred because it exhibits high reactivity and can be handled with ease. In that instance, the sulfido group may be directly or stepwise via $-CF_2SCl$ converted to $-CF_2SO_2Cl$. Widely varied reaction conditions may be employed. Usually, however, the reaction is carried out at a temperature of 0° to 300° C. under atmospheric or superatmospheric pressure. Chlorine may be used in the form of a dry gas or a solution thereof in water, in an organic solvent such as acetic acid and trifluoroacetic acid, or in an inorganic solvent such as $S_2Cl_2$.

The sulfido group of the sulfur-containing fluorinated vinylether monomer may also be oxidized to a sulfoxide compound with the use of a customarily employed oxidizing agent, such as ozone, concentrated sulfuric acid, fuming sulfuric acid, sulfuryl chloride, hydrogen peroxide, potassium permanganate, potassium dichromate or the like. When a solid oxidizing agent is used, the oxidation reaction is usually effected in an aqueous solution at a temperature of 20° to 200° C. In that instance, penetration of an oxidizing agent into the reactant polymer may be accelerated by adding an organic solvent such as acetic acid or trifluoroacetic acid. The sulfoxide obtained as a result of the above oxidation reaction may be converted to $-CF_2SO_2Cl$ by reacting it with chlorine. The so derived sulfonyl chloride group may be converted to a sulfonate salt by the hydrolysis with an alkali.

When the terminal group Y of the sulfur-containing fluorinated vinylether monomer is a sulfo group of the formula $-SO_2R_4$ in which $R_4$ is as defined above exclusive of a chlorine atom, the group may be converted to a sulfonyl chloride group and then hydrolyzed to a sulfonate salt in substantially the same manner as mentioned above for the sulfido group.

Moreover, the above sulfonyl chloride group may be further converted to a sulfonyl fluoride group by reacting with an alkali metal fluoride such as sodium fluoride. On the other hand, the sulfonyl fluoride group may be hydrolyzed with an alkali to give a sulfonate salt, which may be converted to a sulfonyl chloride group by the use of phosphorous pentachloride, etc.

Furthermore, the sulfonyl halide group may generally be reduced with an ordinarily employed reducing agent to give a sulfinic acid group or its salt. The kind of reducing agent may be the same as that to be used in the third step as will be mentioned later.

Next, the thus obtained fluorocarbon polymer containing pendant groups of the formula:

$$-O(CF_2)_mSO_2X$$

wherein X and m are as defined above, may be subjected to reduction reaction in the third step of the present invention to provide a fluorocarbon polymer suitable for producing a cation exchange membrane according to the present invention.

Preferred groups of the formula $-O(CF_2)_mSO_2X$ constituting the pendant groups of a fluorocarbon polymer to be subjected to treatment with a reducing agent are as follows:

$$-O(CF_2)_mSO_2F$$

or $$-O(CF_2)_mSO_2Cl.$$

Reducing agents which are well known in the art may be used, inclusive of those mentioned in Japanese Patent Application Laid-Open Specification No. 24177/1977.

The reducing agents suited to reduce pendant groups of the formula:

$$-O(CF_2)_mSO_2X$$

wherein X represents $-OM$ in which M is as defined above, include, for example, metal hydrides of the formula $MeLH_4$, wherein Me represents an alkali metal atom and L represents an aluminum or boron atom, or $MeH_y$ wherein Me represents an alkali metal atom or alkaline earth metal atom and y is an integer of 1 to 2. These include, for example, lithium aluminum hydride, lithium boron hydride, potassium boron hydride, sodium boron hydride, sodium hydride, lithium hydride, potassium hydride, barium hydride, and calcium hydride.

The reducing agents especially suited to reduce the pendant sulfonyl fluoride group (namely, X is F) include, for example, the above metal hydrides represented by the formula of $MeLH_4$ or $MeH_y$ and hydrazines represented by the following formula:

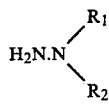

wherein $R_1$ and $R_2$ each independently stand for a hydrogen atom or an alkyl group containing 1 to 3 carbon atoms. Hydrazine and its derivative such as methylhydrazine and ethylhydrazine may be used for the above purpose, but hydrazine is particularly preferred because it is readily available.

The reducing agents especially suited to reduce the pendant sulfonyl chloride group (namely, X is Cl) and the pendant sulfinic acid group or its salt (namely, X is H or M, M having the same meaning as defined above) include, for example, inorganic acids possessing reducing activity such as hydrobromic acid, hydroiodic acid, sulfurous acid, hypophosphorous acid and thiosulfuric acid, and their salts such as potassium bromide, potassium iodide, sodium sulfite and sodium thiosulfate. In this connection, it should be noted that depending on the combination of the kind of the reducing agent and the type of the reactant pendant groups of the formula $-O(CF_2)_mSO_2X$, there are occasions that the pendant group is only converted to a sulfinic acid or a salt thereof without undergoing further necessary reduction reaction. In such instances, it is needed for more strong reducing agents and/or more strong reduction reaction conditions to be employed, or heat treatment in an acid atmosphere be conducted.

The reducing agent used for the above purpose of this invention may be contacted with the fluorocarbon polymer in the form of a liquid, gas or solution. When the reducing agent is used in a gas state, it is preferred that an inert gas, such as nitrogen and helium, be added to the reduction reaction system as a diluent. When the reducing agent is used in the form of a solution, a solvent may preferably be used which is not only inert to the reducing agent used but to the system of the intended reduction reaction. As the solvent for the reduction reaction, there may be mentioned, for example, water, alcohols such as methanol, ethanol and butanol, carboxylic acids such as acetic acid and propionic acid, ethers such as ethyl ether and tetrahydrofuran, and mixtures thereof.

With respect to the reduction reaction, the optimum conditions are to be chosen taking into consideration the kind of the reducing agent, the type of the pendant groups of the formula $-O(CF_2)_mSO_2X$, the percentage of the groups to be converted to $-O(CF_2)_{m-1}COOM'$, and other factors affecting the reaction.

Usually, the reduction reaction is conducted at a temperature of $-50°$ C. to $250°$ C., more preferably $0°$ C. to $150°$ C.

The amount of the reducing agent should be more than that equivalent to the pendant groups of the formula $-O(CF_2)_mSO_2X$ wherein X and m are as defined above that are present in the polymer. Usually, the reducing agent is preferably added in large excess.

The pH of the reaction system may vary depending upon the kind of the reducing agent employed, and the reaction system may be, according to the situation, acid, neutral or alkaline. The reaction may be conducted under the atmospheric or superatmospheric pressure. The reaction time may be in the wide range of from one minute to 200 hours.

The rate of conversion of the groups of the formula $-O(CF_2)_mSO_2X$ to groups of the formula $-O(CF_2)_{m-1}COOM'$ by the treatment with a reducing agent may be determined by analyzing the sulfur content of the polymer, studying the infra-red absorption spectrum of the film obtained from the polymer or applying staining technique to film obtained from the polymer, with respect to the samples taken before and after the reducing treatment.

From the viewpoint of the thermal stability and melt viscosity, the preferred form of the fluorocarbon polymer obtained according to the above procedures is a fluorocarbon polymer having as pendant groups both $-O(CF_2)_mSO_2F$ and $-O(CH_2)_{m-1}COOR_5$ in which $R_5$ stands for an alkyl group containing 1 to 5 carbon atoms. For this reason, after the reducing treatment, it may, according to need, recommended to convert the remaining groups of the formula $-O(CF_2)_mSO_2X$ to $-O(CF_2)_mSO_2Cl$ by the use of chlorine, phosphorus pentachloride or the like and further to $-O(CF_2)_mSO_2F$ by the use of sodium fluoride or the like. On the other hand, the group $-O(CF_2)_{m-1}COOM'$ may be reacted with an alcohol containing 1 to 5 carbon atoms in the presence of an acid catalyst to give a group of the formula $-O(CH_2)_{m-1}COOR_5$.

The polymer thus containing pendant groups of the formulae $-O(CF_2)_mSO_2F$ and $-O(CF_2)_{m-1}COOR_5$ is shaped into a membrane in the fourth step, using any of a variety of well known techniques, e.g. T-die extrusion, inflation, calendering or compression.

Prior to subjecting to such a membrane-forming step, the polymer may be kneaded by means of rolls, mixer or single-, twin- or multiple-screw kneader. The prekneading may be conducted at a temperature equal or close to that to be employed when forming a film. The film-forming temperature of the polymer is higher than the melting point of the polymer, but is lower than the decomposition point of the polymer. The film-forming temperature may be varied depending on the equivalent weight and molecular weight of the polymer, the kind of the pendant groups, the content ratio of sulfonyl fluoride groups to carboxylate groups and other factors, but may usually be in the range of from $150°$ C. to $450°$ C., more preferably from $200°$ C. to $350°$ C.

The thickness of the film normally may be in the range of from $5\mu$ to $100\mu$, more preferably from $7\mu$ to $50\mu$.

In the case of the cation exchange membrane having two bonded films which is the preferred embodiment of the invention as mentioned above, two kinds of polymers having pendant groups of the formula $-O(CF_2)_mSO_2F$ has the same meaning as defined above) and having two different equivalent weights (EW) are prepared according to the polymerization methods as described above, followed by shaping, and fabricated into a composite membrane. The first film is required to have an EW of at least 150 greater than the EW of the second film. The first film comprisng a fluorocarbon polymer containing carboxylic acid and/or carboxylate groups is preferably to have a thickness of 1/20 to ½ of the entire thickness in order to lower the electrical resistance of the two-layer type composite membrane.

The membrane obtained from the polymer according to the present invention may be laminated with a reinforcing material such as fabrics for the improvement of the mechanical strength of the membrane. As the reinforcing material, fabrics of polytetrafluoroethylene fibers are most suitable. A porous polytetrafluoroethylene sheet and the like may also be useful for the above purpose. In the case of a double-layer type composite membrane, the reinforcing material should be laminated on a side where the EW is smaller than that on the other side.

By saponifying the thus obtained membrane in an aqueous alkaline solution, there is obtained a cation exchange membrane comprising a layer containing pendant groups of the formula $-O(CF_2)_{m-1}COOM'$. In the preferred embodiment of the invention, there is provided a double-layer type composite membrane which comprises the above-mentioned layer and a second layer containing pendant groups of the formula $-O(CF_2)_mSO_3M'$.

The cation exchange membrane according to the present invention may preferably be used as a diaphragm to conduct electrolysis of an aqueous sodium chloride solution. The membrane of the present invention is capable of constantly exhibiting a high current efficiency and low electrolytic voltage over a long period of time. In the case of a doublelayer cation exchange membrane, the layer containing carboxylic acid groups is to be positioned to face the cathode during the electrolysis in order to insure a high current efficiency. If electrolysis is conducted with the layer containing carboxylic acid groups facing the anode, a current efficiency will be lowered.

The following examples are given by way of illustration only, and are not to be construed to be limiting this invention, many apparent variations of which are possible without departure from the spirit or scope thereof.

EXAMPLE 1

Charged in a 1,000 ml stainless steel autoclave were 290 g of

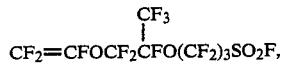

580 g of 1-chloro-2,2-dichlorotrifluoroethane and 0.04 g of perfluoropropionyl peroxide. After flushing the apparatus with nitrogen gas, the temperature of the mixture was held at 25° C., and the copolymerization was allowed to proceed while adjusting the pressure of tetrafluoroethylene to 3.4 kg/cm²-gauge so that the copolymerization reaction may proceed at a constant rate. After completion of the copolymerization reaction (at the time when about 90.7 g tetrafluoroethylene was introduced), 140 g of a polymer (hereinafter referred to as Polymer A) was recovered.

A portion of the thus obtained Polymer A was pressure-molded, while heating at 260° C., into a film. The film was saponified in an aqueous alkaline solution to determine the ion exchange capacity. The ion exchange capacity was found to be 0.71 meq/g (of dry resin) (equivalent weight 1408) by an acid-base titration method.

The remaining portion of Polymer A in the form of powder was hydrolyzed in a mixture of 1.0 part by volume of aqueous 6 N potassium hydroxide and 1.0 part by volume of methanol at 70° C. for 5 hours. The resulting polymer was washed with water, dried, and immersed in a mixture (1:1 by weight) of phosphorus pentachloride and phosphorus oxychloride, and was heated at 120° C. for 40 hours. Then, the polymer was washed with carbon tetrachloride, and immersed in a mixture of 1.0 part by volume of 57% by weight hydroiodic acid and 1.0 part by volume of glacial acetic acid, and then heated at 83° C. for 100 hours. After the above treatment, the resulting polymer was immersed in a mixture of 4.0 parts by volume of 12 N hydrochloric acid and 96.0 parts by volume of methanol, heated at 60° C. for 16 hours, and washed with water until the water used for washing showed neutrality.

The sulfur content of the resulting polymer was determined to be as low as 0.11% by weight as compared with 2.27% for the starting polymer. The obtained polymer was kneaded by means of rolls, and pressure-molded at 260° C. to prepare a film of approximately 100μ in thickness (hereinafter referred to as Film A). The Film A was subjected to measurement of attenuated total reflection spectrum, which showed a strong absorption band at 1,800 cm$^{-1}$ characteristic of carboxylate group and a weak absorption band at 1,470 cm$^{-1}$ characteristic of sulfonyl fluoride group.

The Film A was immersed in a mixture (1:1 by volume) of 6 N sodium hydroxide and heated at 60° C. for 16 hours. Subsequently, the film was immersed in an aqueous 0.1 N caustic soda solution, and heated at 90° C. for 16 hours.

The film was utilized as the membrane in the electrolysis of sodium chloride and the current efficiency and electrolytic voltage were measured, as follows.

The electrolytic cell had a service area of 0.06 dm² (2 cm×3 cm) and comprised an anode compartment and a cathode compartment separated by the cation exchange membrane. A metallic, dimensionally stable anode was used, and an iron plate was used as the cathode. An aqueous saturated sodium chloride solution, while maintaining the pH value of the aqueous sodium chloride solution at pH 3 by addition of hydrochloric acid, was circulated through the anode compartment and an aqueous 6.5 N caustic soda solution through the cathode compartment at 95° C., while maintaing the concentration of the aqueous caustic soda solution constantly at 6.5 N by adding water. Under these conditions, an electric current was passed between the electrodes at a current density of 40 amperes/dm². The current efficiency was calculated by dividing the amount of caustic soda produced in the cathode compartment per hour by the theoretical value calculated from the amount of electricity passed. The results are shown in Table 1.

TABLE 1

| Passage of Current (hours) | 24 | 720 |
|---|---|---|
| Current Efficiency (%) | 96 | 96 |
| Cell Voltage (V) | 4.2 | 4.3 |

EXAMPLE 2

Substantially the same procedures as described in Example 1 were repeated except that the pressure of charged tetrafluoroethylene was decreased to 2.1 kg/cm²-gauge, to obtain a polymer having an ion exchange capacity of 0.86 meq/g (hereinafter referred to as Polymer B). The Polymer B was heat-pressed to form a film of approximately 100μ in thickness (hereinafter referred to as Film B).

The reduced-form polymer prepared in the same manner as in Example 1 was heat-pressed to form a 40μ-thick film (hereinafter referred to as Film A'). Film A' was laminated on Film B at 260° C. to form a double-layer membrane The double-layer membrane was saponified in a mixture of 1.0 part by volume of 6 N caustic soda and 1.0 part by volume of methanol at 72° C. for 16 hours. Then, it was immersed in an aqueous 0.1 N caustic soda solution, and heated at 90° C. for 16 hours. Electrolysis was conducted in the same manner as described in Example 1, with the Film A' side facing the cathode. The results are shown in Table 2.

TABLE 2

| Passage of Current (hours) | 24 | 720 |
|---|---|---|
| Current Efficiency (%) | 96 | 96 |
| Cell Voltage (V) | 3.6 | 3.6 |

COMPARATIVE EXAMPLE 1

Substantially the same procedures as described in Example 1 were repeated except that

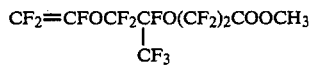

was used instead of

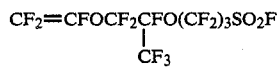

to obtain a polymer having an ion exchange capacity of 0.70 meq/g (hereinafter referred to as Polymer C). The Polymer C was heat-pressed at 260° C. to form a 40μ-thick film (hereinafter referred to as Film C).

The Film C was laminated on Film B prepared according to Example 2 at 260° C. to form a double-layer membrane. The double-layer membrane was saponified in an aqueous alkaline solution and immersed, with heating, in a 0.1 N caustic soda solution, in the same manner as mentioned in Example 2.

Electrolysis was conducted in the same manner as described in Example 1, with the Film C side facing the cathode. The results are shown in Table 3.

TABLE 3

| Passage of Current (hours) | 24 | 720 |
|---|---|---|
| Current Efficiency (%) | 96 | 90 |
| Cell Voltage (V) | 3.7 | 4.1 |

After completion of the electrolysis, the cross-section of the used laminated membrane cut perpendicularly to the surfaces thereof was visually observed to find the occurrence of partial peeling-off at the border line of lamination of the membranes Film B and Film C.

EXAMPLE 3

Polymer A containing pendant sulfonyl fluoride groups prepared according to Example 1 (in the form of powder) was immersed in a mixture (1:1 by volume) of aqueous 6 N potassium hydroxide and methanol, and heated at 70° C. for 4 hours to saponify. The resulting polymer was washed with water, dried, and immersed in a mixture (1:1 by weight) of phosphorus pentachloride and phosphorus oxychloride, and was heated at 120° C. for 40 hours. Then, the polymer was washed with carbon tetrachloride, and immersed in a mixture of 1.0 part by volume of aqueous 47% by weight hydrobromic acid and 1.0 part by volume of glacial acetic acid, and then heated at 85° C. for 120 hours. After the above treatment, the resulting polymer was immersed in a mixture of 4.0 parts by volume of 98% by weight sulfuric acid and 96.0 parts by volume of methanol, heated at 60° C. for 16 hours, and washed with water until the water used for washing showed neutrality.

The sulfur content of the resulting polymer was determined to be as low as 0.23% by weight. The obtained polymer was kneaded by means of rolls at 260° C., and pressure-molded to prepare a film of approximately 40μ in thicknes.

The resulting film was laminated on Film B prepared according to Example 2, and saponified with an alkali in the same manner as described in Example 2. Electrolysis was conducted in the same manner as described in Example 1, with the Film A side facing the cathode. The results are shown in Table 4.

TABLE 4

| Passage of Current (hours) | 24 | 720 |
|---|---|---|
| Current Efficiency (%) | 93 | 92.5 |
| Cell Voltage | 3.5 | 3.5 |

EXAMPLES 4 to 6

Substantially the same procedures as described in Example 3 were repeated, except that the reducing agent indicated in Table 5 was used instead of a mixture of 1.0 part by volume of 47% by weight hydrobromic acid and 1.0 part by volume of glacial acetic acid, and that the polymer after the reducing treatment was immersed in aqueous 5 N hydrochloric acid and heated at 90° C. for 20 hours before heating in a mixture of 4.0 parts by volume of 98% by weight sulfuric acid and 96.0 parts by volume of methanol at 60° C. for 16 hours. Electrolysis was conducted in the same manner as in Example 1. The electrolysis results are shown in Table 5.

TABLE 5

| | | Passage of current: 24 hrs | | Passage of current: 720 hrs | |
|---|---|---|---|---|---|
| Ex. | Reducing agent and reduction conditions | Current efficiency (%) | Cell voltage (V) | Current efficiency (%) | Cell voltage (V) |
| 4 | Mixture (1:1 by vol) of aqueous 40 wt % KI and methanol 60° C., 20 hrs | 93 | 3.5 | 93 | 3.6 |
| 5 | Mixture (1:1 by vol) of aqueous 30 wt % NaI and methanol 60° C., 30 hrs | 93 | 3.5 | 92 | 3.5 |
| 6 | Mixture (1:1 by vol) of aqueous 30 wt % Na₂S₂O₃ and meth- | 92 | 3.6 | 92 | 3.6 |

TABLE 5-continued

| Ex. | Reducing agent and reduction conditions | Passage of current: 24 hrs | | Passage of current: 720 hrs | |
|---|---|---|---|---|---|
| | | Current efficiency (%) | Cell voltage (V) | Current efficiency (%) | Cell voltage (V) |
| | anol 60° C., 40 hrs | | | | |

EXAMPLE 7

A powdery Polymer A prepared according to Example 1 was immersed in aqueous 80% by weight hydrazine and heated at 25° C. for 30 hours. The resulting polymer was washed with water until the water used for washing showed neutrality, and immersed in a mixture (1:1 by volume) of 57% by weight hydroiodic acid and glacial acetic acid, followed by heating at 83° C. for 100 hours. Then, the resulting polymer was immersed in a mixture of 4.0 parts by volume of 98% by weight sulfuric acid and 96.0 parts by volume of methanol, heated at 60° C. for 16 hours, and washed with water until the water used for washing showed neutrality. The so obtained polymer was dried, kneaded by means of rolls at 260° C., and pressure-molded to prepare a film of approximately 40μ in thickness. The film was laminated on Film B prepared according to Example 2 and saponified with an alkali in the same manner as described in Example 2. Electrolysis was conducted in the same manner as described in Example 1, and the electrolysis results are shown in Table 6.

TABLE 2

| Passage of Current (hours) | 24 | 720 |
|---|---|---|
| Current Efficiency (%) | 96 | 96 |
| Cell Voltage (V) | 3.6 | 3.6 |

EXAMPLE 8

In a 300 ml stainless steel autoclave, 10 g of $CF_2=CFO(CF_2)_3SC_2H_5$ and 0.1 g of ammonium persulfate were emulsified in water using perfluorooctanoic acid ammonium salt as an emulsifying agent. Tetrafluoroethylene gas was introduced under a pressure of 15 kg/cm²-gauge, and copolymerization was conducted at 50° C. with addition of sodium hydrogensulfite to promote the polymerization reaction. The so obtained polymer was found to contain 4.23% by weight of sulfur by elementary analysis. The polymer was exposed to chlorine gas at 120° C. for 20 hours, and heated in saturated aqueous chlorine at 83° C. for 20 hours. The resulting polymer was immersed in a mixture (1:1 by volume) of aqueous 57% by weight hydroiodic acid and glacial acetic acid, heated at 85° C. for 100 hours, and washed with water until the water used for washing showed neutrality. After drying, the polymer was immersed in a saturated solution of potassium fluoride in sulfolane, heated at 80° C. for 50 hours, washed with water, and dried. Then, the polymer was immersed in a mixture (4:96 by volume) of 98% by weight sulfuric acid and methanol at 60° C. for 16 hours, washed with water and dried. The resulting polymer was kneaded by means of rolls at 250° C., and pressure-molded to prepare a film of approximately 100μ in thickness. The film was immersed in a mixture (1:1 by volume) of 6 N sodium hydroxide and methanol, and heated at 60° C. for 16 hours. Subsequently, the film was immersed in an aqueous 0.1 N caustic soda solution, and heated at 90° C. for 16 hours. Utilizing the film as the cation exchange membrane, electrolysis was conducted according to substantially the same manner as described in Example 1, except that the alkali concentration in the cathode compartment was set at 12 N. The results are shown in Table 7.

TABLE 7

| Passage of Current (hours) | 24 | 720 |
|---|---|---|
| Current Efficienty (%) | 93 | 93 |
| Cell Voltage | 3.4 | 3.4 |

What is claimed is:

1. A process for preparing a double-layer cation exchange membrane of fluorocarbon polymer having an improved interlayer adhesion, comprising the steps of:
subjecting to chemical treatment at a temperature of from 0° to 150° C. for a period of from 1 to 200 hr with a reducing agent, said agent being at least one member selected from the group consisting of HI, HBr, KI, NaI, Na$_2$SO$_2$O$_3$ and hydrazine, a starting fluorocarbon polymer containing pendant groups of the formula:

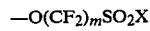

wherein X is a fluorine atom, a cholorine atom, a hydrogen atom, M or OM in which M represents a hydrogen atom, a metal atom or an ammonium group and m is an integer of 3 to 5 to convert a portion of said —O(CF$_2$)$_m$SO$_2$X groups to carboxylic acid groups of the formula:

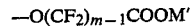

wherein N' represents a hydroen atom, a metal atom or an ammonium group and m is as defined above, thereby to obtain a first fluorocarbon polymer having an equivalent weight of 800 to 2,00;
transforming the first fluorocarbon polymer into a film to obtain a first layer; and
laminating the first layer on a second layer of a second fluorocarbon polymer containing pendant groups of the formula:

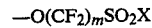

wherein X and m are as defined above, and having an equivalent weight of 800 to 1,5000, said first fluorocarbon polymer having an equivalent weight of at least 150 greater than that of said second fluorocarbon polymer, to obtain a double-layer cation exchange membrane comprising the first layer of the first fluorocarbon polymer containing said carboxylic acid groups, which are uniformly distributed in the layer, with said —O(CF$_2$)$_m$SO$_2$X groups and, laminated on the first layer, the second layer of the second fluorocarbon polymer containing said —O(CF$_2$)$_m$SO$_2$X groups, said first layer having an equivalent weight of at least 150 greater than that of said second layer.

2. A process according to claim 1, wherein the reducing agent is at least one member selected from the group consisting of hydrazine, hydrobromic acid and hydroiodic acid.

3. A process according to claim 1, wherein each of the starting fluorocarbon polymer and the second fluorocarbon polymer is prepared by copolymerizing a monomer selected from the group consisting of olefins of the formula:

$$CA_1A_2 = CA_3A_4$$

wherein $A_1$ and $A_2$ each independently stand for F or H, $A_3$ stands for F, Cl or H, and $A_4$ stands for F, Cl, $CF_3$, H, $CH_3$ or $OR_F$, in which $R_F$ stands for a $C_1$-$C_5$ perfluoroalkyl group, and a monomer selected from the group consisting of sulfur-containing fluorinated vinylethers of the formula:

$$CF_2=CFO(CF_2CFO)_{\theta}(CF_2)_m-Y$$
$$\quad\quad\quad\quad\quad |$$
$$\quad\quad\quad\quad CF_3$$

wherein $\theta$ stands for 0 or 1, m is an integer of 3 to 5, and Y stands for $-SR_3$ or $-SO_2R_4$ in which $R_3$ represents a $C_1$-$C_{10}$ alkyl group, a $C_6$-$C_{14}$ aryl group, a chlorine atom or a $C_1$-$C_{10}$ perfluoroalkyl group, $R_4$ represents $R_3$, F or OM, said M representing a hydrogen atom, a metal atom or an ammonium group.

4. A process according to claim 1, which further comprises saponifying the double-layer cation exchange membrane to convert said pendant groups of the formula $-O(CF_2)_mSO_2X$ to sulfonic acid groups of the formula $-O(CF_2)_mSO_3M'$ wherein $M'$ represents a hydrogen atom, a metal atom or an ammonium group and m is an integer of 3 to 5.

5. A process for preparing a double-layer cation exchange membrane of fluorocarbon polymer having an improved interlayer adhesion, comprising the steps of:
subjecting to chemical treatment at a temperature of from 0° to 150° C. for a period of from 1 to 200 hr with a reducing agent, said agent being at least one member selected from the group consisting of HI, HBr, KI, NaI, $Na_2SO_2O_3$ and hydrazine, a starting fluorocarbon polymer containing pendant groups of the formula:

$$-O(CF_2)_mSO_2X$$

wherein X is a fluorine atom, a chlorine atom, a hydrogen atom, M or OM in which M represents a hydrogen atom, a metal atom or an ammonium group and m is an integer of 3 to 5 to convert a portion of said $-O(CF_2)_mSO_2X$ groups to carboxylic acid groups of the formula:

$$-O(CF_2)_{m-1}COOM'$$

wherein $M'$ represents a hydrogen atom, a metal atom or an ammonium group and m is as defined above, thereby to obtain a first fluorocarbon polymer having an equivalent weight of 800 to 2,000;
converting with an alcohol said $-O(CF_2)_{m-1}COOM'$ groups to $-O(CF_2)_{m-1}COOR_5$ wherein $R_5$ represents an alkyl group containing 1 to 5 carbon atoms;
forming the resulting first fluorocarbon polymer into a film to obtain a first layer;
laminating the first layer on a second layer of a second fluorocarbon polymer containing pendant groups of the formula:

$$-O(CF_2)_mSO_2X$$

wherein X and m are as defined above, and having an equivalent weight of 800 to 1,500, said first fluorocarbon polymer having an equivalent weight of at least 150 greater than that of said second fluorocarbon polymer to obtain a double-layer cation exchange membrane; and
saponifying the double-layer cation exchange membrane to convert said $-O(CF_2)_{m-1}COOR_5$ groups and $-O(CF_2)_mSO_2X$ groups, respectively, to carboxylic acid groups of the formula $-O(CF_2)_{m-1}COOM'$ and sulfonic acid groups of the formula $-O(CF_2)_mSO_3M'$, wherein m and $M'$ are as defined above, thereby to obtain a double-layer cation exchange membrane comprising the first layer of the first fluorocarbon polymer containing said carboxylic acid groups, which are uniformly distributed in the layer, with said sulfonic acid groups and, laminated on the first layer, the second layer of the second fluorocarbon polymer containing said sulfonic acid groups, said first layer having an equivalent weight of at least 150 greater than that of said second layer.

6. A process for preparing a double-layer cation exchange membrane of fluorocarbon polymer having an improved interlayer adhesion, comprising the steps of:
subjecting to chemical treatment at a temperature of from 0° to 150° C. for a period of from 1 to 200 hr with an aqueous solution containing a reducing agent, said agent being at least one member selected from the group consisting of HI, HBr, KI, NaI, $Na_2SO_2O_3$ and hydrazine, a starting fluorocarbon polymer containing pendant groups of the formula:

$$-O(CF_2)_mSO_2X$$

wherein X is a fluorine atom, a chlorine atom, a hydrogen atom, M or OM in which M represents a hydrogen atom, a metal atom or an ammonium group and m is an integer of 3 to 5 to convert a portion of said $-O(CF_2)_mSO_2X$ groups to carboxylic acid groups of the formula:

$$-O(CF_2)_{m-1}COOM'$$

wherein $M'$ represents a hydrogen atom, a metal atom or an ammonium group and m is as defined above, thereby to obtain a first fluorocarbon polymer having an equivalent weight of 800 to 2,000;
separating the first fluorocarbon polymer from the aqueous solution containing the reducing agent;
kneading the thus obtained polymer;
forming the polymer into a film to obtain a first layer; and
laminating the first layer on a second layer of a second fluorocarbon polymer containing pendant groups of the formula:

$$-O(CF_2)_mSO_2X$$

wherein X and m are as defined above, and having an equivalent weight of 800 to 1,500, said first fluorocarbon polymer having an equivalent weight of at least 150 greater than that of said second fluorocarbon polymer, to obtain a double-layer cation exchange membrane comprising the first layer of the first fluorocarbon polymer containing said carboxylic acid groups, which are uniformly distributed in the layer, with said $-O(CF_2)_mSO_2X$ groups and, laminated on the first layer, the second layer of the second fluorocarbon polymer containing said $-O(CF_2)_mSO_2X$ groups, said first layer having an equivalent weight of at least 150 greater than that of said second layer.

* * * * *